Dec. 25, 1928.
H. B. HASKINS
1,696,353
MANUFACTURE OF WINDOW REGULATORS
Original Filed July 12, 1926
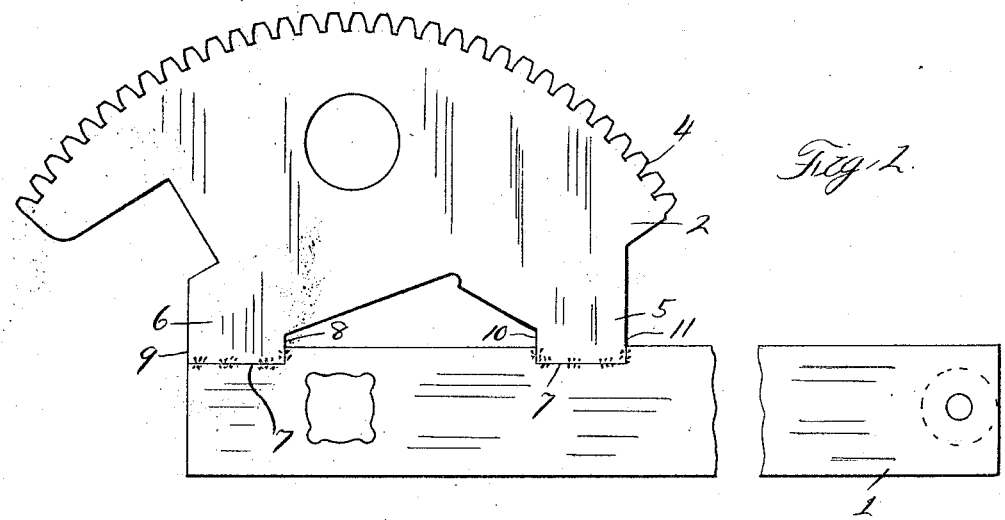
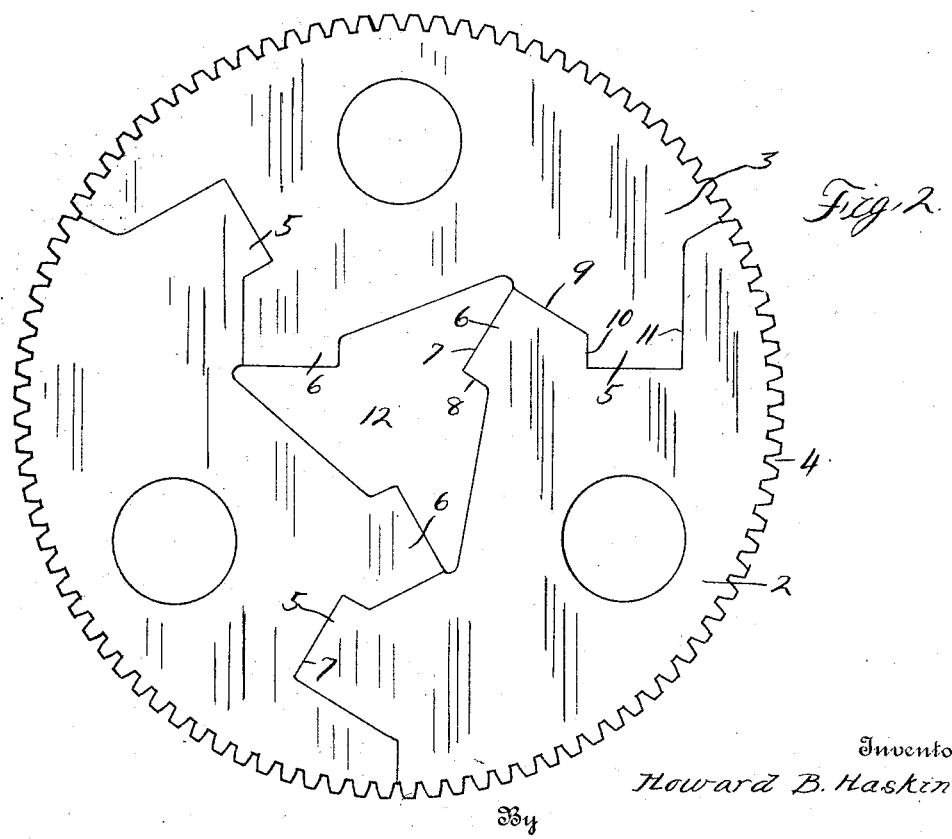
Inventor
Howard B. Haskins
By
Attorneys Patented Dec. 25, 1928.

1,696,353

UNITED STATES PATENT OFFICE.

HOWARD B. HASKINS, OF TOLEDO, OHIO, ASSIGNOR TO THE DURA COMPANY, OF TOLEDO, OHIO, A CORPORATION OF DELAWARE.

MANUFACTURE OF WINDOW REGULATORS.

Application filed July 12, 1926, Serial No. 121,954. Renewed May 11, 1927.

The invention relates to the manufacture of window regulators and refers particularly to the manufacture of window regulator units each comprising a gear segment and a lifter arm. One of the objects of the invention is the manufacture of the gear segments with the minimum loss of material and with the minimum cost. Another object is the economical manufacture of the units. With these as well as other objects in view the invention resides in the novel features of construction and combinations and arrangements of parts as more fully hereinafter set forth.

In the drawings:—

Figure 1 is a plan view of a window regulator unit comprising a gear segment and a lifter arm;

Figure 2 is a plan view of the blank from which the gear segments are formed and showing the lines of severing.

As shown in Figure 1, 1 is the lifter arm and 2 the gear segment which is secured to the lifter arm and forms therewith a window regulator unit, the arm being connected at its upper end to the window and the gear segment meshing with the driving pinion. To economically manufacture the gear segment I form a circular blank 3 with the peripheral teeth 4 preferably by hobbing the blank. The blank is then symmetrically severed to form the series of like gear segments 2 with the teeth 4 at their outer edges and the pair of anchoring portions 5 and 6 at their inner edges and also at their ends. The anchoring portions of each gear segment have aligned edges 7 at their ends for abutting the lifter arm and the anchoring portion 5 has the substantially parallel edges 8 and 9 at its sides while the anchoring portion 6 has the substantially parallel edges 10 and 11 at its sides. These anchoring portions are so arranged that the anchoring portions 5 overlap the anchoring portions 6 of adjacent gear segments and a single line of severing separates these overlapping anchoring portions. Furthermore, the anchoring portions 6 are so arranged that the severing of the central approximately triangular-shaped portion 12 of the blank 3 completes the severing of these anchoring portions and further cooperates with the same to form a recess in the inner edge of each gear segment so that the aligned edges of the pair of anchoring portions may freely contact with the lifter arm when being secured thereto.

For securing a gear segment to a lifter arm, I butt-weld the anchoring portions 5 and 6 of the gear segment to the lifter arm with these anchoring portions set into the lifter arm to assist in reinforcing the weld. By butt-welding the anchoring portions to the lifter arm the diameter of the blank from which the gear segment is formed is kept at the minimum and at the same time a series of gear segments may be formed from this blank so that a decided saving in material as well as cost is effected. In securing a gear segment to a lifter arm it is to be noted that the teeth of the gear segment extend equally in opposite directions from the radial line passing through the pivotal axis of the arm so that the latter may swing equally in either direction with the driving pinion in mesh with the gear segment.

With this method of forming both the gear segments and securing the gear segments to the lifter arms to form the window regulator units, it will be seen that both the gear segments and window regulator units may be economically manufactured. It will also be seen that the gear segments are secured to the lifter arms in the planes thereof, thereby increasing the strength of the window regulator units, as well as decreasing their thickness.

What I claim as my invention is:

1. In the manufacture of gear segments each having a series of teeth at one edge and anchoring portions at the opposite edge, the forming of a blank with teeth at its periphery and the severing of the blank into like gear segments with overlapping anchoring portions.

2. In the manufacture of gear segments each having an arcuate series of teeth at one edge and anchoring portions at the opposite edge near the ends, the forming of a blank with teeth at its periphery and the severing of the blank into a series of like gear segments with overlapping anchoring portions.

3. In the manufacture of window regulator gearing, the forming of a circular blank with peripheral teeth and the symmetrical severing of the blank into like gear segments with overlapping anchoring portions at their ends.

4. In the manufacture of a window regulator, the forming of a circular blank with peripheral teeth, the severing of the blank into like gear segments with overlapping anchoring portions and the securing of like lifter arms to the anchoring portions of the gear segments.

5. In the manufacture of a window regulator, the forming of a circular blank with peripheral teeth, the severing of the blank into a series of like gear segments with overlapping anchoring portions at their ends and the welding of like lifter arms to the edges of the anchoring portions of the gear segments.

6. In a window regulator, the combination of a lifter arm and a gear segment having an arcuate series of teeth at one edge and a plurality of anchoring portions at the opposite edge set into and welded to said arm.

7. In a window regulator, the combination of a lifter arm and a gear segment having an arcuate series of teeth at one edge of a length to to be included with an angle of 120 degrees having as its apex the central point about which the teeth extend concentrically, said gear segment also having a plurality of anchoring portions at the opposite edge and near its ends set into and welded to said arm.

8. In the manufacture of a window regulator, the forming of a circular blank with peripheral teeth, the severing of the blank into like gear segments with overlapping anchoring portions and the securing of the anchoring portions of the gear segments to lifter arms in the planes thereof.

9. In a window regulator, the combination of a lifter arm member and a gear member having teeth at an edge, one of said members having an anchoring portion set into and welded to the other member.

10. In the manufacture of a window regulator, the forming of a toothed member with teeth at its periphery, the forming of a lifter arm member, the assembling of the members in the same plane and with one member set into the other, and the securing of the adjacent portions of the members.

In testimony whereof I affix my signature.

HOWARD B. HASKINS.